March 9, 1954
T. W. FLORY
2,671,667
FLOATING TOOLHOLDER
Filed Feb. 8, 1951
2 Sheets-Sheet 1
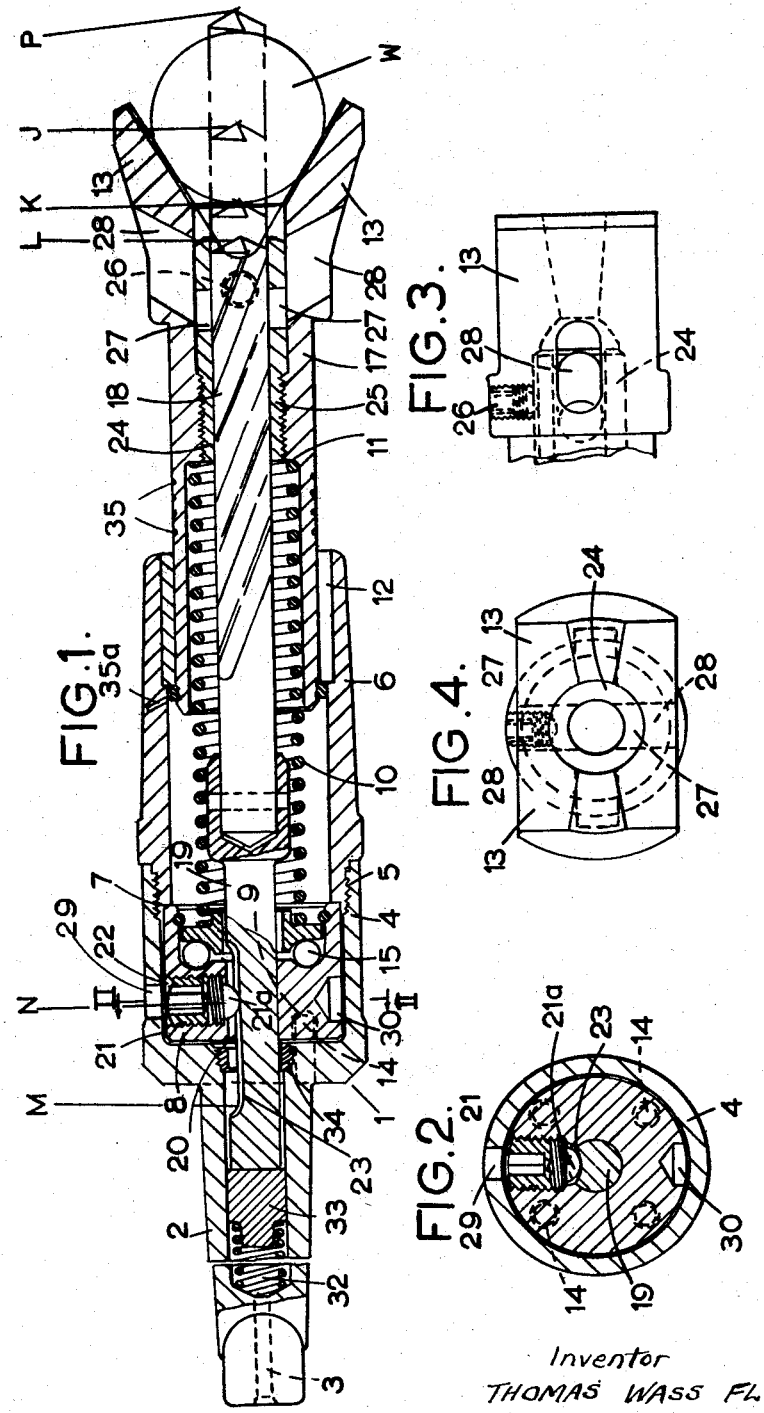
Inventor
THOMAS WASS FLORY
By
Attorney

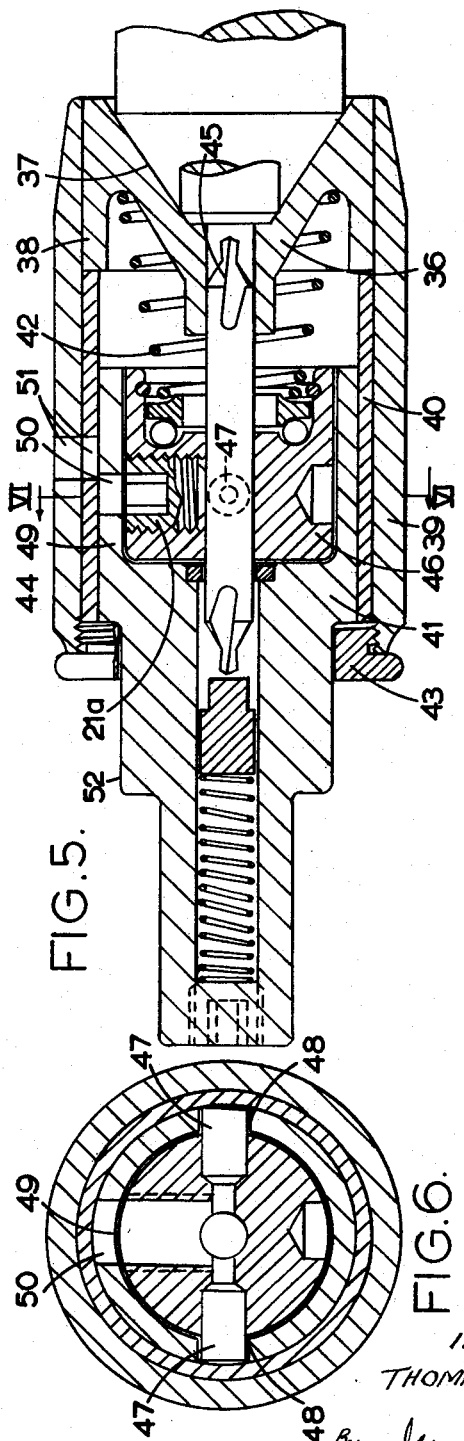

Patented Mar. 9, 1954

2,671,667

UNITED STATES PATENT OFFICE 2,671,667

FLOATING TOOLHOLDER

Thomas Wass Flory, Folkestone, England

Application February 8, 1951, Serial No. 210,073

16 Claims. (Cl. 279—18)

This invention relates to floating tool holders, of the kind in which the tool is held and rotated about its longitudinal axis, but is arranged to be permitted a small displacement from said axis during rotation, and especially, but not exclusively, of the kind in which the tool is operated through a guide or series of guides designed to centralize said tool in relation to the workpiece, such guide being preferably incorporated in the tool holder housing itself. Alternatively, tool holders of the type to be described may be used to operate tools through separate guides, or for reaming or opening out existing holes, or for any application where the tool is tending to follow a predetermined path.

It is known to provide a chuck for a drill in which the drive is transmitted through a series of grooved plates, steel balls being located in the grooves and allowing the plates to be displaced laterally relatively to one another, so that the drill can rotate about an axis parallel with the axis of rotation of the chuck.

An object of the present invention, however, is to provide a holder for a tool, such as a drill, which may not only be operated on an axis parallel to that of the drill spindle but which will carry the tool in such a way that undesirable stresses on the tool, such as lateral stresses caused by misalignment of the tool on a curved surface of the work to be machined, are minimised. In the latter case the displacement of the axis of the tool from the axis of the chuck may be regarded, therefore, as an angular displacement about an intermediate nodal point on the axis of the chuck. This nodal point may itself, however, be slightly offset from the axis of the chuck.

A further object of the invention is to provide means whereby the tool can be displaced laterally with respect to the axis of rotation of the tool holder, or can take up a position at a slight angle to the said axis, with greater ease and less risk of the parts jamming or binding than in previous chucks.

According to the invention a holder for a rotary tool, for mounting in a machine tool, is provided with a driving member arranged to be secured to the machine, a driven member rotated by said driving member and so supported by the driving member as to be free to float to a limited extent in any direction radially with respect to the axis of rotation of the driving member, and means for securing a tool to the driven member, the driving and driven members constituting a kinematic pair of elements.

It is to be understood that the term "kinematic pair of elements" used herein is intended to define two bodies constrained to maintain contact (with or without an intervening anti-friction device not otherwise affecting the operation of the pair) while relative movement takes place between them.

The holder may be arranged to accommodate a drill or reamer that is to take a path predetermined by a center hole on the one hand or a hole to be reamed out on the other, the floating driven member enabling the end of the tool to locate the center or hole and then to operate, if necessary, off center, either parallel to or at a limited angle with the said axis. Alternatively, the holder may be provided with a tool guide which engages the work at one end and is supported by the driving member at the other, the floating driven member in this arrangement serving to relieve friction in the guide when there is a tendency for the tool point to be forced off center.

Advantageously, the said driven member may include a drum mounted with a comparatively small circumferential clearance in a socket provided in the driving member, the drive between the two members being effected by at least one projection engaging a recess having such clearance with respect to the projection as to permit the drum to float radially.

In order that the invention may be clearly understood and readily carried into effect, some constructions in accordance therewith will now be described, by way of example, with reference to the accompanying drawings, in which:

Figure 1 is a sectional elevation of one form of tool holder, shown holding a twist drill;

Figure 2 is a section on the line II—II in Figure 1;

Figures 3 and 4 are a plan and front end elevation respectively of the forward portion of the tool holder of Figures 1 and 2;

Figure 5 is a sectional elevation of a second form of tool holder, shown holding a double ended center drill; and Figure 6 is a cross-section on the line VI—VI in Figure 5.

The tool holder shown in Figures 1 to 4 is primarily intended for drilling transverse holes through the longitudinal axes of rods or bars. The body or driving member I consists of a hollow tapered spigot 2, closed at the smaller end except for a small passage 3, and at the larger end formed as a cylindrical open-ended socket 4 of considerably greater diameter than the spigot.

The open end of the socket is internally threaded to receive a correspondingly threaded end 5 of an open-ended sleeve 6 forming an extension of the socket, the inner end of said sleeve forming an inwardly projecting shoulder 7 within the socket 4. The sleeve 6 may be considered as part of the socket 4.

Between this shoulder 7 and that end of the socket adjacent to the spigot, which will be termed the closed end, there is disposed a drum 8, consisting of a cylindrical block of metal or other suitable material slightly smaller in diameter than the bore of the socket, so that it is permitted radial float therein. The shoulder of the sleeve and the closed end of the socket limit the axial movement of the drum within the socket. At the transverse plane of contact between said closed end and the drum there are four passages 9 parallel to the axis of the drum and spaced equally around the periphery. Each passage accommodates a pin 14, carried by the socket 4, which is loose enough, relatively to the drum, to allow said drum to move radially within the limits prescribed by its float in the socket.

At its outer end the drum 8 is recessed to accommodate a thrust race 15 against which bears one end of a helical compression spring 10. The other end of this spring bears against a shoulder 11 in a drill guide 17 in the form of a sleeve which is mounted rotatably and slidably within a bush 12 carried by the sleeve 6, and is formed at its outer end with divergent horns 13. Complete ejection of the tool guide 17 is prevented by a split ring 31 mounted in a recess in the tail end of the tool guide 17 and arranged to engage the end of the bush 12.

The twist drill 18 is fixed to one end of a drill holder 19 clamped in a passage 20 in the drum 8 by an Allen or set screw 21 that is screwed into a radial passage 22 in the drum 8 and bears on a lateral surface 23 on the drill holder 19. The surface 23 is recessed and slightly inclined to the axis of the drum so as to prevent the tool from slipping axially relatively thereto when the set screw has been adjusted and pressure is exerted between the tool and the work. The surface 23 is also grooved and limited in length to prevent the tool from turning about its axis with respect to the drum and from being completely ejected by spring 32 when the setscrew 21 is released. The drill is supported in the drill guide 17 by an interchangeable bush 24 screwed into the guide 17 at 25 and locked by a set screw 26 carried by the guide 17 and engaging a groove in the outer surface of the bush 24. The bush 24 is formed with radial passages 27 and the drill guide 17 with radial passages 28 for the disposal of swarf. If desired the bush 24 may be formed with an internal groove joining the passages 27 to receive the swarf.

Each of the set screws 21 and 26 is formed with a hexagonal-section recess to receive a correspondingly shaped Allen key. Access to the set screw 21 is obtained through an aperture 29 in the wall of the socket 4. To balance the drum 8 a recess 30 is formed therein diametrically opposite the set-screw 21. It will be observed that, as the set screw 21 does not project outside the socket 4, it presents no danger in use. Moreover, as the aperture 29 is of smaller diameter than the set screw 21, the latter cannot be removed without dismantling the assembly. The internal diameter of the socket 4 is such that the set screw 21 can be withdrawn sufficiently to permit the drill to move longitudinally a distance corresponding to the length of the groove surface 23, although the hemispherical end 21a cannot be withdrawn so much as to permit it to escape from the groove surface 23.

The hollow spigot 2 accommodates a compression spring 32 which bears on a pad 33, slidable within the hollow interior, and urges it outward from the spigot. This pad 33 in turn bears on the inner end of the drill holder 19. Ejection of the pad 33 from the spigot 2 is prevented by a retaining collar 34 screwed into the closed end of the socket 4. Moreover, the drill holder 19 cannot be shot forward further than is permitted by the engagement of the left hand end of the surface 23 with the end 21a of the set screw 21. An oil hole 35a as well as the aperture 29 prevents air pressure from building up behind the tool guide when the latter moves inwards.

From the foregoing it will be seen that, generally speaking when the drill is now fed down on to the work, with the machine running, the guide 17 remains stationary straddling the work, sleeve 6 and bush 12 rotating on the guide as on a journal. As the drill continues to be fed downwardly, the socket 4 descends relatively to the guide against the compression spring 10. Rotary motion of the socket is imparted to the drum through the four radial pins 14, and so to the drill 18. Lateral stresses on the drill, due to inequalities in the work or other causes, may result in the drill becoming slightly offset relatively to the axis of the holder. The upper end of the drill, where it passes through the drum, may be offset in the direction opposite to that of the lateral stress on the drill to the extent, on the one hand, of the radial float permitted to the drum 8, and, on the other hand, of the small tolerance between the bush 12 and the guide 17 and the bush 24 and the drill 18. The nodal point, that is, the intersection of the axes of the drill and the tool holder, is within the bore of the drill guide.

In this way there is obviated the fracture of drills due to bending under lateral stress, and a more accurate and rapid drilling, particularly of transverse holes in rods and bars, may be achieved.

To set the drill initially, release the set screw 21 permitting the drill 18 in holder 19 to be forced outwards by the action of the spring 32 until the end 21a of the set screw 21 occupies the extreme position M remote from the drill point, in the groove 23. The drill point will then protrude beyond the extremity of the drill guide to approximately the position J.

Now place the tool in a drill press and bring it down towards the workpiece W which will first be contacted by the drill point and then (as downward movement continues, and the drill 18 is forced backwards against the spring 32) by the horns 13. As pressure is continued still further, the drill guide 17 compresses the spring 10 so that the horns are now firmly held against the workpiece W. Pressure should be further continued until the selected annular index mark 35 is in line with the outer edge of the bush 12 when the drill holder 19 should be locked by means of set screw 21 which will then be located somewhere between the two extremities of the groove 23. The drill point will then be in the position K. The annular index mark 35 to be selected will depend on the size of drill in use, greater compression of spring 10 being desirable for the larger drills. The tool is then retracted from the work allowing the tool guide 17 to be forced outwards by spring 10 in relation to the drill point. For example, it may be retracted to the position L. Thus, when the tool is applied to the work, the horns 13 straddle the workpiece under considerable pressure from the spring 10 and before contact is made by the drill point. This ensures that the drill is properly and accurately applied to the work.

It is to be noted that the maximum depth of hole obtainable at one setting can never exceed the total movement of the guide 11 in relation to the sleeve 6, but if it is desired to drill a deeper hole this may be accomplished in the following manner, without dismantling the apparatus.

Having drilled to the maximum possible depth on the first application of the tool, raise the drill press, thus withdrawing the drill from the bored hole, keeping the horns 13 still in contact with the workpiece. Then release the set screw 21 whereupon the spring 32 forces the drill outwards until it is checked by the extremity M of the groove 23 or the bottom of the hole already drilled. Then tighten set screw 21 to grip the drill holder in its new position. By a further operation of the drill press a correspondingly deeper hole may then be drilled in the workpiece. For example, if at the first drilling the set screw 21 is at position N, then the maximum additional depth obtainable at the second drilling is the length M—N—equivalent to a movement J—P of the drill point.

The construction shown in Figures 5 and 6 differs from that particularly described above mainly in the shape of the drill guide, the manner of mounting the drill guide and the manner in which the drum is driven. It will be seen that the tool guide 36 is formed with a frusto-conical recess 37 for engaging a frusto-conical end on a workpiece and with a skirt 38 fixed in one end of a sleeve 39 carrying a bush 40 reciprocable on the outside of the body 41 of the tool holder. The guide 36 is urged outwards by a spring 42 and the forward movement is limited by an annular cap 43 screwed into the sleeve 39 and bearing on a shoulder 44 on the body 41. The centre drill 45 is mounted in precisely the same way as the drill holder in the construction of Figures 1 to 5 but the drum 46 is driven by two radial pins 47 that project with some clearance into apertures 48 in the cylindrical wall of the socket 49 of the body 41. As in the construction of Figure 1, the socket 41 is formed with an aperture 50 giving access to the set-screw 21a, and apertures 51 are provided for the same purpose in the sleeve 39 and bush 40. These apertures 51 only register with the aperture 50 when the tool guide has been pressed back far enough and the parts turned relatively to one another sufficiently to bring the apertures into axial alignment. Markings respectively on the part 52 of the body 41 and on the assembly comprising the sleeve 39 and cap 43 indicate when the apertures are in alignment.

In the construction shown in Figures 5 and 6 the radial clearance between the socket 49 and the drum 46, when the latter is centred, is five one thousandths of an inch.

Operation is substantially similar to that of the previous embodiment. Owing to the presence, however, of the outer sleeve 39 which forms part of the guide, the guide may be brought to rest while the tool holder is rotating, merely by the operator gripping the guide. This eliminates damage to a delicate workpiece through frictional contact with a revolving guide. The embodiment is limited to workpieces of regular shape, that is, balls or knobs, the ends of bars, bosses, or the like of circular cross-section, or of regular triangular, square, or polygonal cross-section. Such a workpiece is centred by the guide as has been explained in connection with the previous embodiment.

I claim:

1. A holder for a rotary tool, for mounting in a machine tool, said holder comprising, in combination, a driving member arranged to be secured to the machine to rotate about an axis, a driven member supported by and operatively connected to said driving member so as to be driven thereby while free to float to a limited extent in any direction radially with respect to the axis of rotation of said driving member, means for securing a tool to said driven member to rotate about said axis, a tubular tool guide coaxial with said driving member and mounted to reciprocate thereon while being free to remain stationary as said member rotates, and resilient means urging said guide towards the work to be machined, said guide being formed at its outer end to engage the work and so be steadied thereby.

2. A holder according to claim 1, in which said tool guide is formed at its outer end with divergent horns arranged to straddle a round bar with its axis at right angles to the tool.

3. A holder according to claim 1, in which said tool guide is formed at its outer end with a conical recess arranged to engage the work formed with a conical end.

4. A holder according to claim 1, in which the tool guide is formed with an aperture between its ends for the disposal of swarf.

5. A holder according to claim 1, in which said tool guide and said driving member are formed with marks adapted to indicate when said tool guide has been pressed backwards a predetermined distance against said resilient means, and in which said means for securing the tool to said driven member are operable when said guide is thus pressed backwards.

6. A holder according to claim 1, provided with resilient means for urging the tool outwards from said driven member, and the said means for securing the tool to said driven member being adapted to enable said tool to be secured to said driven member after said tool and said guide have simultaneously been pressed backwards against their respective resilient means to a predetermined extent, while said guide is left free to be projected forwards again, relatively to the tool, under the action of the resilient means associated with said guide.

7. A holder for a rotary tool, for mounting in a machine tool, said holder comprising, in combination, a driving member arranged to be secured to the machine to rotate about an axis and formed with a socket concentric with said axis, a tubular tool guide coaxial with said driving member and mounted to reciprocate thereon while being free to remain stationary as said member rotates, a driven member mounted in said socket and operatively connected to said driving member so as to be driven thereby while free to float in any direction radially with respect to said axis, means for fixing to said driven member a tool fitting inside said tubular tool guide, and resilient means urging said guide towards the work to be machined, said guide being formed at its outer end to engage the work and so be steadied thereby.

8. A holder according to claim 7, in which said resilient means is constituted by a compression spring, said holder being further provided with an anti-friction bearing which together with said spring is interposed between said driven member and said guide.

9. A tool assembly comprising a rotary tool having a shank formed on one side with a surface inclined to the axis of said tool and a holder for said tool, for mounting in a machine tool said holder comprising, in combination, a driving member arranged to be secured at one end to a machine, to be rotated thereby, and formed with a socket and further formed with a lateral passage leading into said socket, a driven member mounted with a comparatively small circumferential clearance in said socket, said driven member being formed with an axial passage to receive a tool and with a lateral screw threaded passage, a set screw in said threaded passage for securing said tool in said driven member by engaging said inclined surface so as to prevent the tool from slipping axially and circumferentially when applied to the work, said set screw being wholly within said socket and of such diameter that it cannot be removed through said lateral passage but being adapted to be screwed to a limited extent through said threaded passage by means inserted through said lateral passage, and means operatively connecting said driving and driven members so that said driven member is rotated by said driving member while being free to undergo translational floating movement radially relatively thereto.

10. A holder for a rotary tool, for mounting in a machine tool, said holder comprising, in combination, a driving member arranged to be secured to the machine to rotate about an axis, means for securing a driving connection between a tool and said driving member so as to cause the tool to rotate with said driving member, a tubular tool guide coaxial with said driving member and mounted to reciprocate thereon while being free to remain stationary as said member rotates, first resilient means urging said guide towards the work to be machined, said guide being formed at its outer end to engage the work and second so to be steadied thereby, and resilient means for urging the tool outwards from said driving member, said means for securing said driving connection between the tool and said driving member being adapted to enable said connection to be made after the tool and said guide have simultaneously been pressed backwards against their respective resilient means to a predetermined extent, whereby said first resilient means maintains the guide firmly against the work throughout the drilling stroke of said tool and said second resilient means serves to force the tool forward when said securing means is released thereby enabling said tool to be locked in a new position relatively to said driving member.

11. A holder for a rotary tool as claimed in claim 10, in which the outer end of the guide is formed with divergent horns arranged to straddle a round bar with its axis at right angles to the tool.

12. A holder for a rotary tool as claimed in claim 10 in which the outer end of the tool guide is formed with a conical recess arranged to engage the work formed with the conical end.

13. A holder for a rotary tool as claimed in claim 10, in which the tool guide is formed with an aperture between its ends for the disposal of swarf.

14. A holder for a rotary tool, for mounting in a machine tool, said holder comprising, in combination, a driving member arranged to be secured to the machine to rotate about an axis, means for securing a tool to said driving member to rotate about said axis, a tubular tool guide coaxial with said driving member and mounted to reciprocate thereon while being free to remain stationary as said member rotates, resilient means urging said guide towards the work to be machined, said guide being formed at its outer end to engage the work and so be steadied thereby, second resilient means being mounted in said driving member and being adapted to exert an axial thrust on the tool when the latter is moved in a direction away from the work engaging end of the tool guide, so that the tool may be locked by said securing means to said driven member with said second resilient means stressed, and an anti-friction thrust bearing interposed between said first-mentioned resilient means and said driven member.

15. A tool assembly according to claim 9, wherein said surface on said shank is provided with a longitudinal groove and wherein the inner end of said set-screw projects into said groove in all positions of adjustment thereof, whereby said set screw remains in register with said groove during the longitudinal adjustment of the tool with respect to said driven member.

16. A holder for a rotary tool, for mounting in a tubular driving member arranged to be secured to the machine to rotate about an axis, a driven member mounted within said driving member and formed with an axial passage to receive a tool shank, a driving connection between said two members whereby said driven member is rotated by said driving member while being free to undergo translational floating movement radially relatively thereto, a tubular tool guide telescopically mounted within said driving member and projecting from one end of the latter, said tool guide being free to remain stationary while said driving and driven members rotate and being formed at its outer end to engage the work and so be steadied thereby, a compression spring interposed between said driven member and said tool guide, an anti-friction thrust bearing interposed between said spring and said driven member, a second compression spring, said springs being coaxial with the tool guide and said second compression spring being adapted to act at one end on said driving member and at the opposite end on the inner end of the tool shank, and means for locking the shank to said driven member.

THOMAS WASS FLORY.

References Cited in the file of this patent

UNITED STATES PATENTS

| Number | Name | Date |
|---|---|---|
| 1,308,681 | Prideaux | July 1, 1919 |
| 1,357,843 | Cashman | Nov. 2, 1920 |
| 1,368,484 | Cashman | Feb. 15, 1921 |
| 1,831,382 | Gairing | Nov. 10, 1931 |
| 2,363,940 | Brockway | Nov. 28, 1944 |
| 2,365,986 | Wilson | Dec. 26, 1944 |
| 2,475,385 | Frisco | July 5, 1949 |
| 2,532,058 | Clark | Nov. 28, 1950 |